Figure 1:
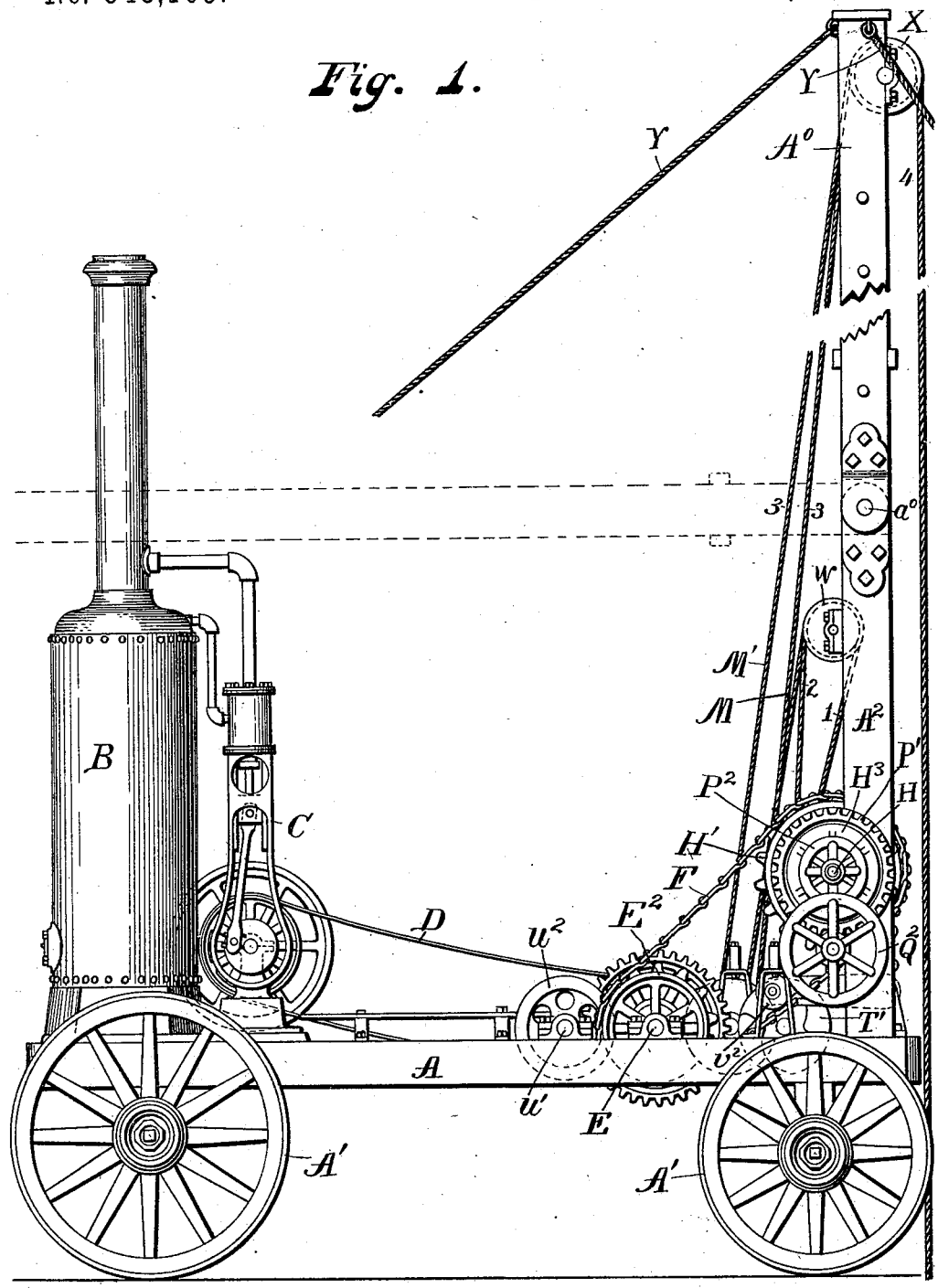

(No Model.)

5 Sheets—Sheet 1.

O. P. BENJAMIN.
WELL BORING MACHINE.

No. 548,109.   Patented Oct. 15, 1895.

Witnesses
Percy C. Bowen.
Maurice J. Sioussa.

Inventor
O. P. Benjamin,
By Whitman & Wilkinson,
Attorneys.

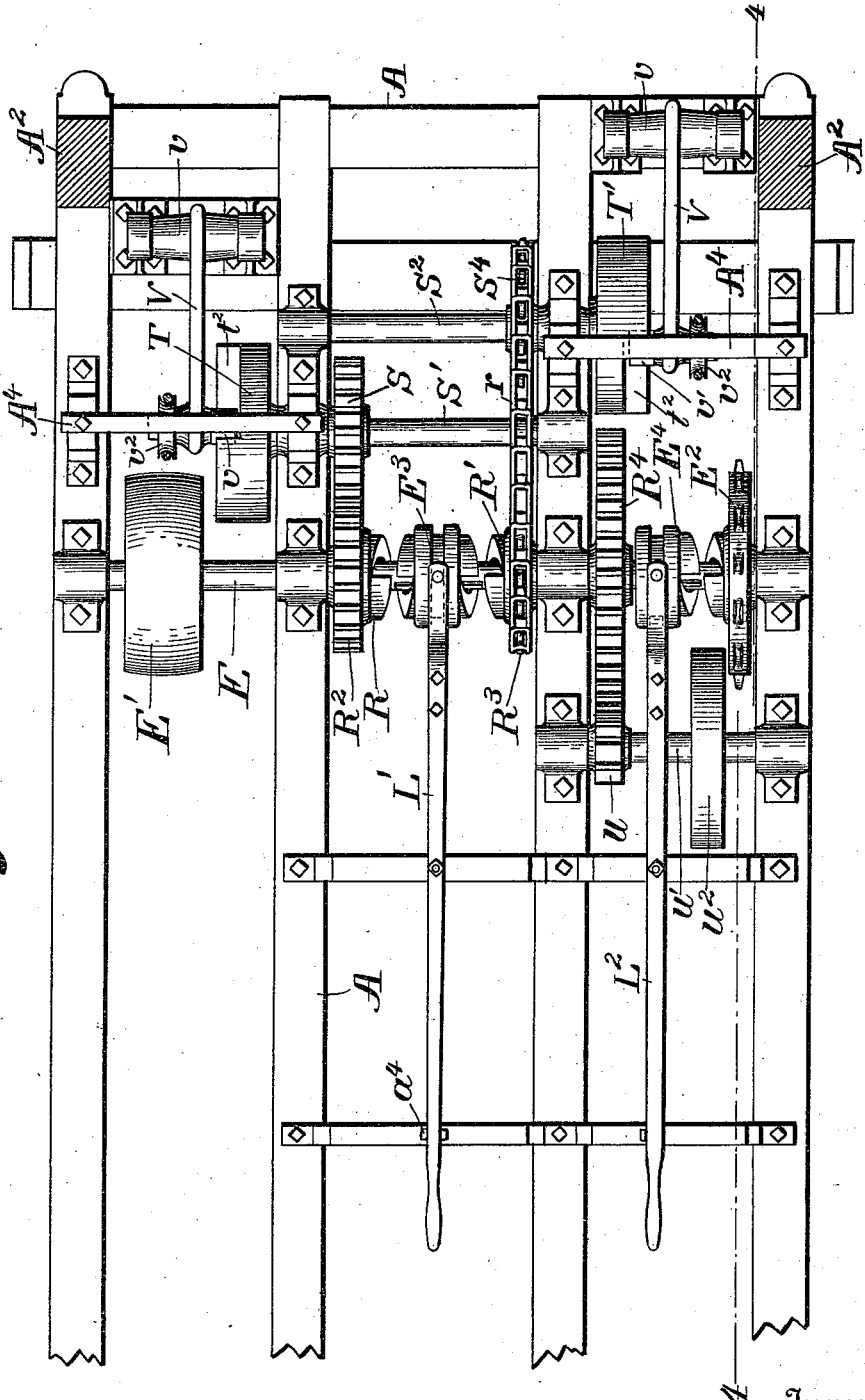

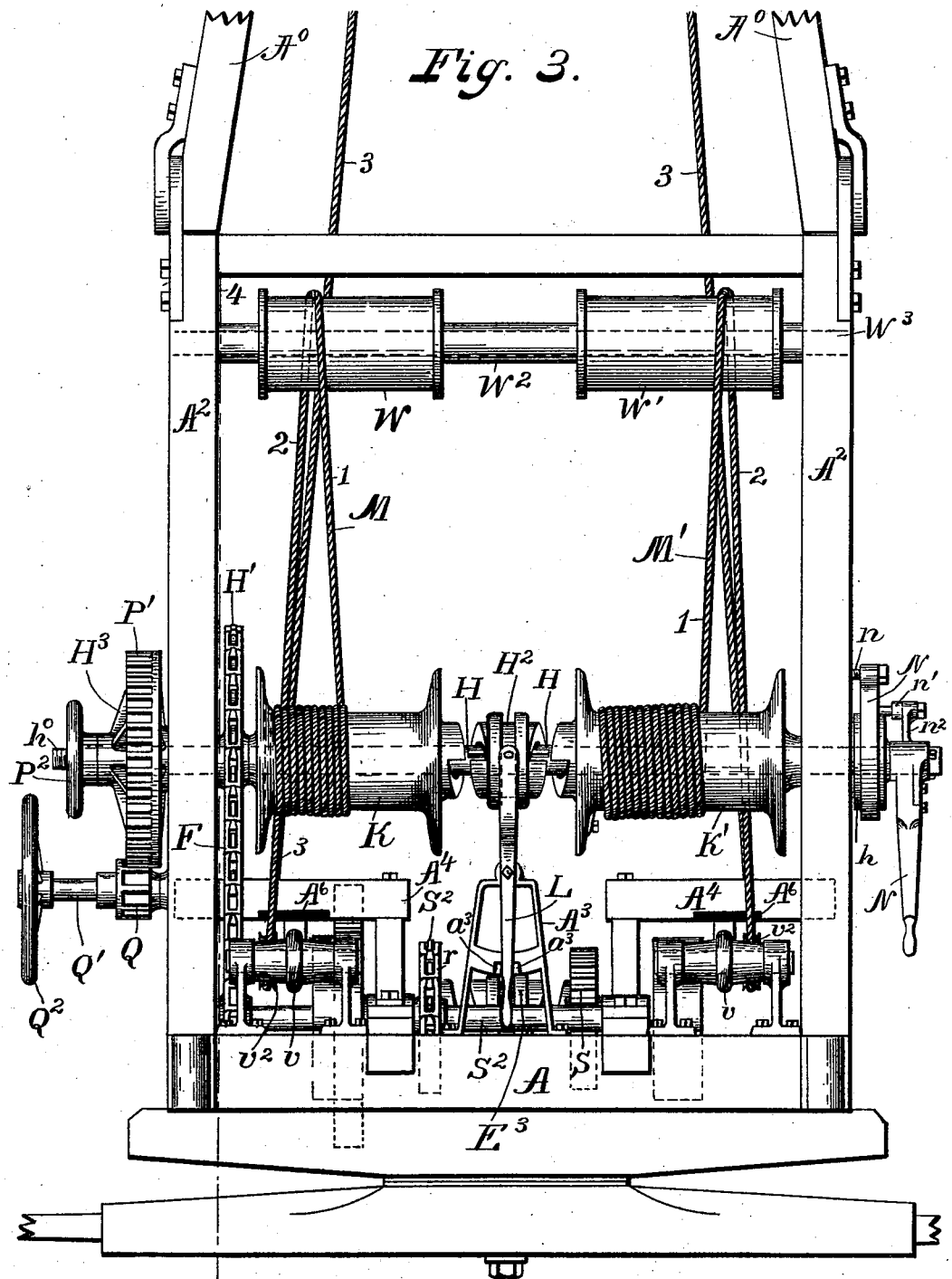

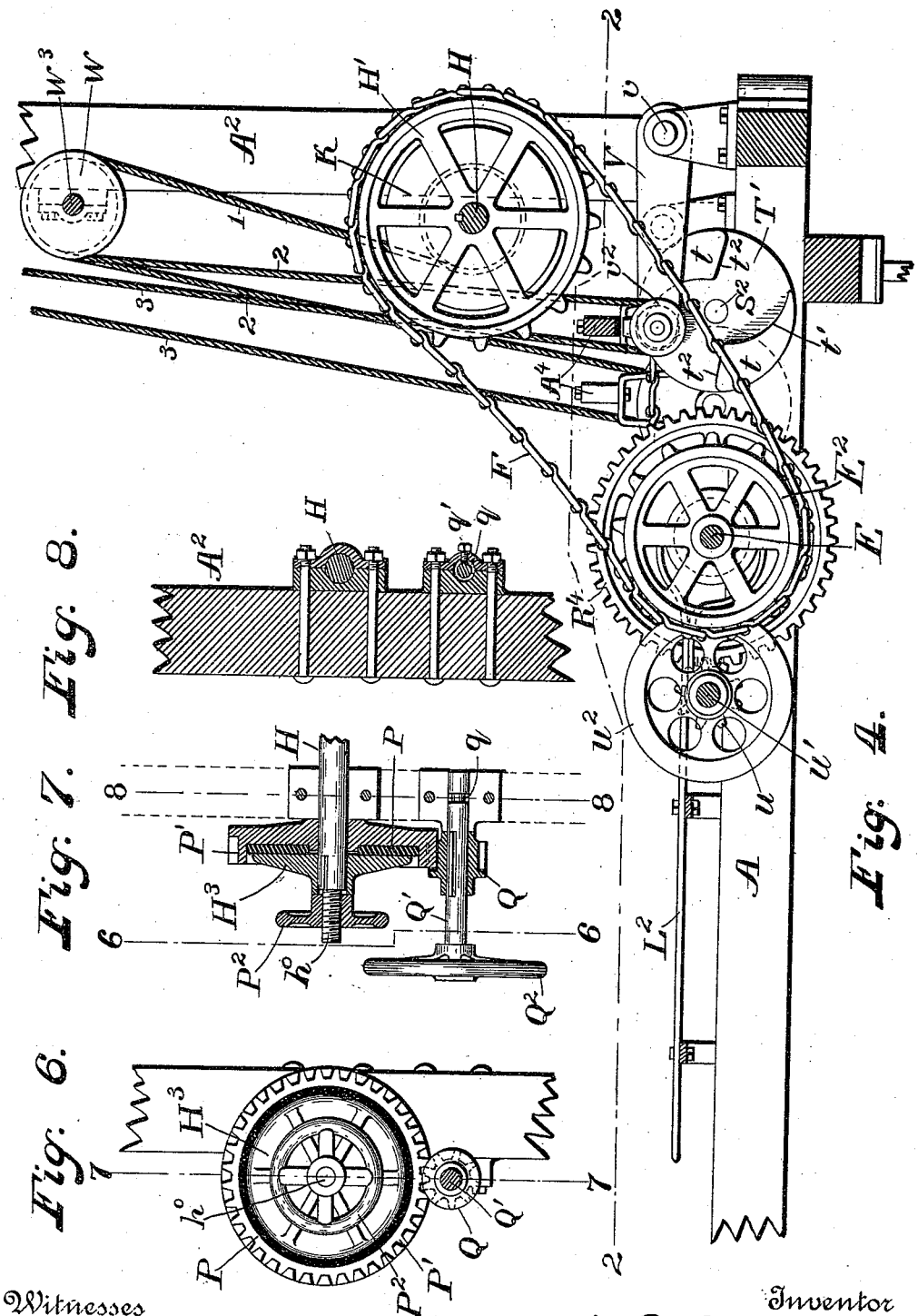

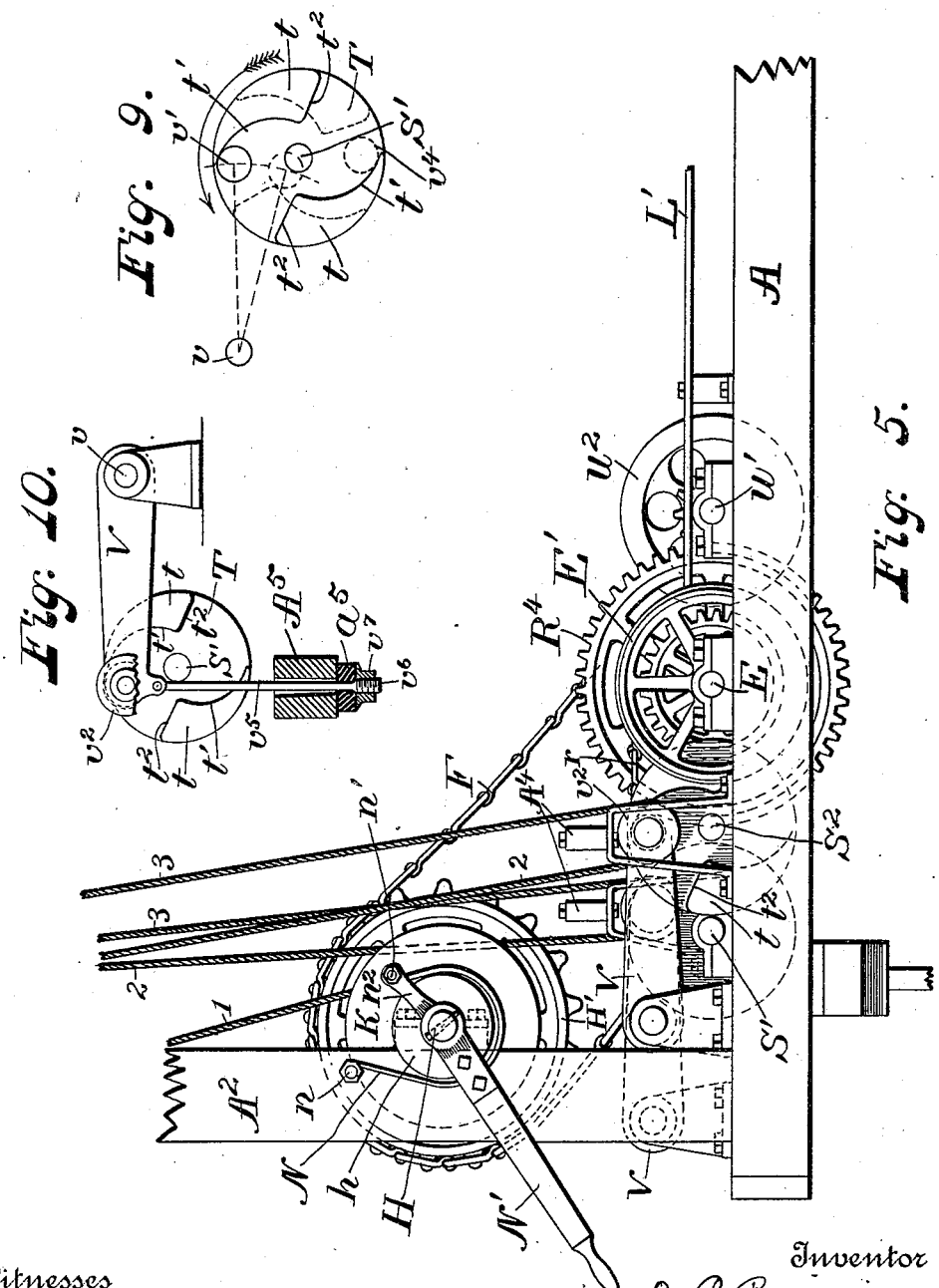

UNITED STATES PATENT OFFICE.

OSCAR P. BENJAMIN, OF LAFAYETTE, INDIANA.

WELL-BORING MACHINE.

SPECIFICATION forming part of Letters Patent No. 548,109, dated October 15, 1895.

Application filed May 28, 1895. Serial No. 550,982. (No model.)

*To all whom it may concern:*

Be it known that I, OSCAR P. BENJAMIN, a citizen of the United States, residing at Lafayette, in the county of Tippecanoe and State of Indiana, have invented certain new and useful Improvements in Well-Boring Machines; and I do hereby declare the following to be a full, clear, and exact description of the invention, such as will enable others skilled in the art to which it appertains to make and use the same.

My invention relates to improvements in machines for boring wells, especially Artesian and oil wells; and it consists of certain novel features, hereinafter described and claimed.

Reference is had to the accompanying drawings, in which the same parts are indicated by the same letters and numerals throughout the several views.

Figure 1 represents a side elevation of the machine, parts being broken away. Fig. 2 represents a section along the line 2 2 of Fig. 4 and looking down. Fig. 3 represents an end view of the machine as seen from the right of Fig. 1, the wheels of the wagon-body being removed and the lower part of the machine only being shown, and that on an enlarged scale. Fig. 4 represents a section along the broken line 4 4 of Fig. 2 and looking toward the top of the sheet in the said figure. Fig. 5 represents an enlarged detail view of the lower portion of the device shown in Fig. 3, as seen from the right of the said figure. Fig. 6 represents an end view of the feed attachment to control the drop-rope drum, being a section along the line 6 6 of Fig. 7 and looking to the right in the said figure. Fig. 7 represents a section along the line 7 7 of Fig. 6. Fig. 8 represents a section along the line 8 8 of Fig. 7. Fig. 9 represents a diagrammatic view of the dropper-cam and rocker-arm operated by said cam. Fig. 10 is a detail view showing one method of checking the rocker-arm.

A represents the framework of the machine, which for convenience of transportation is preferably mounted upon the wheels A'. Near one end of this framework a derrick is provided, which consists of the rigid lower uprights $A^2$ and the upper timbers $A^0$, hinged thereto, as at $a^0$, and adapted to swing over in transit, as indicated by the dotted lines in Fig. 1. When in use, this derrick is steadied by means of the stay-ropes Y, as shown in Fig. 1. Mounted on this framework A is the boiler B and the steam-engine C, which drives the belt D; but any other convenient source of power may be used, if desired, and the motive power may be separate from or independent of the portable boring-machine herein described and shown. The belt D or other motive power drives the main shaft E, as by means of the pulley E'. This shaft has revolubly mounted thereon the sprocket-wheel $E^2$, which meshes in the sprocket-chain F, passing over the sprocket-wheel H', fast on the shaft H, which shaft carries, near its center, the clutch-piece $H^2$, which is thrown into engagement by means of the hand-lever L with one or the other of the drums K and K', revolubly mounted on the said shaft H. The said clutch-piece $H^2$, being held against turning on the shaft H when thrown into engagement with either of the said drums, causes the said drum to revolve with the said shaft, as shown most clearly in Fig. 3. The hand-lever L, when held in the central position between the lugs $a^3$ on the frame $A^3$, as shown in Fig. 3, holds the said clutch-piece $A^2$ out of engagement with either of the said drums; but when the said hand-lever is moved outside of either of the said lugs $a^3$ one or the other of the said drums is coupled onto the shaft. On these drums the drill-rope and the slush-bucket rope are wound, as will be hereinafter more fully described.

The velocity of the shaft H is controlled by means of the band-brake attachment shown to the right of Fig. 3 and in Fig. 5, while the feed of the said drums is regulated by the attachment shown to the left of Fig. 3 and in Figs. 6, 7, and 8.

The band-brake attachment consists of a band N, secured at one end, as at $n$, to the derrick $A^2$, and at the other end, as at $n'$, to the arm $n^2$ of the hand-lever N', which is pivotally mounted on the shaft H, and by means of which the band N is pressed against or released from the disk $h$, fast on the said shaft.

The feed attachment consists of a disk $H^3$, adapted to slide longitudinally on but held against turning on the shaft H and bearing against a leather annulus P, let into the face of the gear-wheel P', which is loose on said shaft H. The pressure of the disk $H^3$ on the annulus P is regulated by the hand-wheel $P^2$, which screws onto the screw-threads $h^0$ on the end of the shaft H, which is turned down for the purpose, as shown in Fig. 7. This gear-wheel P' meshes in the pinion Q fast on the shaft Q', which is controlled by the hand-wheel $Q^2$. By this mechanism the revolution of the drums K or K' may be limited at will, and yet the friction connection between the shaft H and the feed mechanism will prevent accident to the gear-teeth through any sudden strains, such as are ordinarily experienced in machines of this character.

The shaft Q' may be held in place in any convenient way, but I have shown it as provided with an annular groove $q$, into which projects a set-screw $q'$, as shown in Figs. 7 and 8, whereby the said shaft is allowed to turn freely about its axis, but is held against longitudinal motion in its bearings. The driving-shaft E has revolubly mounted thereon the gear-wheel $R^2$ and the sprocket-wheel $R^3$, having clutch-hubs R and R', respectively. Into these hubs the clutch-piece $E^3$ is adapted to engage, which clutch-piece is held against turning on the shaft E by means of a spline or other suitable device, and by means of this clutch-piece either one or the other of the wheels $R^2$ or $R^3$ may be caused to revolve with the shaft E. The said clutch-piece is controlled by the hand-lever L', which engages between the stops $a^4$ and operates in a similar manner to the hand-lever L, already described with reference to Fig. 3.

The gear-wheel $R^2$ meshes with the gear-wheel S on the shaft S', to which is rigidly attached the dropper-cam disk T. This disk (shown in detail in Fig. 9) is provided with two cams having lifting or cam faces $t'$ with curved cam-surface concave to the axis of said disk and releasing-faces $t^2$, against which engages the roller $v'$, mounted on the rocker-arm V, which is journaled on the shaft $v$, as shown most clearly in Figs. 2, 3, and 4. These rocker-arms also carry the grooved pulleys $v^2$, over which the rope passes, as will be hereinafter described.

The upward travel of the rocker-arm is limited either by a rubber pad $A^6$ on the cross-piece $A^4$, against which the rocker-arm strikes when released, as shown in Fig. 3, or by the device shown in Fig. 10, in which the cross-beam $A^5$ is perforated to admit the rod $v^5$, pivotally connected to the rocker-arm V. The rubber pad $a^5$, mounted above the nut $v^7$, checks the upward motion of the rocker-arm. The end of the rod $v^5$ is screw-threaded, as at $v^6$, and is enlarged to better stand the shocks of vibration. The rocker-arm on the other side of the machine is operated by a similar dropper-cam disk T', fast on the shaft $S^2$ and driven by the sprocket-wheels $R^3$, the sprocket-chain $r$, and the sprocket-wheel $S^4$. It will be seen that these rocker-arms are operated one at a time by the shaft E, as controlled by means of the hand-lever L'. The speed of the shaft E is regulated by means of the spur-wheel $R^4$, which meshes in the pinion U, mounted on the same shaft U' with the fly-wheel $U^2$. The motion of the shaft H is controlled by means of the hand-lever $L^2$, which operates the clutch-coupling $E^4$ and connects the shaft E with the sprocket-wheel $E^2$ when desired.

Two drums or pulleys W and W' are mounted on a shaft $W^3$ across the derrick, as shown in Figs. 1 and 3, and the said drums are kept apart by a sleeve $W^2$, or they may be held between set-collars on the shaft $W^3$ in any convenient way. Similar drums or pulleys X are provided near the head of the derrick, as shown in Fig. 1.

There are two drums used in the machine, as shown in Fig. 3, so that the drop-rope and the slush-bucket rope may be operated independently and by a simple shifting of the clutch mechanism without the necessity of detaching the weight from the drop-rope and then attaching the slush-bucket thereto. When the slush-bucket is in operation, the drop-rope is simply eased down until it is slack enough to allow the slush-bucket to pass freely. The lead of these two ropes is exactly the same, and hence the lead of only one rope will be described. Thus take either the rope M or M'. The said rope is first wound around the drum K or K', as the case may be, and then passing upward, as indicated by the numeral 1, it takes a turn, or a half-turn, around one of the drums W or W', then down, as indicated by the numeral 2, and passing around the grooved pulley $v^2$ at the end of one of the rocker-arms D it passes upward, as indicated by the numeral 3, to the derrick-head, where it passes over the pulley X and then downward into the well, as indicated by the numeral 4 in Fig. 1. As the cam forces down the roller $v'$, (see Fig. 9,) the weight is lifted twice the thickness of the cam, and when the roller $v'$ passes over the releasing end $t^2$ of the cam, as shown in dotted lines to the left of Fig. 9, the weight drops on the drill, to be lifted again by the opposite cam, and thus for every revolution of the disk T the weight is twice lifted and twice dropped.

It will be obvious that if the cam be revolved in a direction opposite to that shown in Fig. 9 the roller may be picked up instead of pressed down by each action of the cams, as shown in dotted lines at $v^4$. In this case the pulleys should be so arranged that the dropping of the dropper-arms would release the weight.

It will be obvious that the rocker-arm for operating the slush-bucket, with its connected parts, will operate in the same way when the position of the hand-lever L' is reversed.

While the cams $t$ would ordinarily regulate the drop of the weight, this may be varied either by shifting the said cam-disk to suit varying conditions or by altering the arrangement of pulleys, so that the drop may be more than double the depth of the cam, if desired.

The feed is given by means of the hand-wheel $Q^2$, while the friction feed-brake prevents excessive strain from being imposed upon the feed mechanism.

The various advantages of the herein-described construction will readily suggest themselves to any one skilled in the art.

Having thus described my invention, what I claim, and desire to secure by Letters Patent of the United States, is—

1. In a well-boring machine, the combination with the overhead pulley, and a rope leading therefrom down into said well, of a rocker arm engaging said rope and provided with a roller near the free end thereof, a rotary disk provided with a pair of cams with curved cam surface concave to the axis of said disk and oppositely disposed and adapted to engage said roller and so haul on said rope, and then to release said roller, substantially as described.

2. In a well-boring machine, the combination with the overhead pulley, and a rope leading therefrom down into the well, of a rocker arm provided with a pulley near the free end thereof over which passes said rope, and also provided with a roller near the said free end, a rotary disk provided with a pair of cams with curved cam surface concave to the axis of said disk and oppositely disposed and adapted to engage said roller and so haul on said rope and then to release said roller, substantially as described.

3. In a well-boring machine, the combination with the overhead pulley, and a rope leading therefrom down into the well, of a drum winding up the inner end of said rope, a friction feed and also a friction brake controlling said drum, a rocker arm provided with a pulley near the free end thereof over which passes said rope, and also provided with a roller near the said free end, a rotary disk provided with a pair of cams with curved cam surface concave to the axis of said disk and oppositely disposed and adapted to engage said roller and so haul on said rope and then to release said roller, substantially as described.

4. In a well-boring machine, the combination with the double overhead pulleys and two ropes leading therefrom down into said well, of a shaft and two drums loosely mounted thereon, each drum having the inner end of one of said ropes wound thereon, a clutch coupling between said drums and adapted to connect either one of said drums to said shaft, means for controlling the motion of said shaft, two rocker arms engaging said ropes and each provided with a roller near the free end thereof, two rotary disks each provided with cam surfaces concave relative to the axis of the disk, and adapted to engage one of said rollers and so haul on said rope, and then to release said roller, and means for rotating one or the other of said disks, as desired, substantially as described.

5. In a well-boring machine, the combination with the double overhead pulleys, and a pair of ropes leading therefrom down into the well, of a shaft and two drums loosely mounted thereon, each drum having the inner end of one of said ropes wound thereon, a clutch coupling between said drum and adapted to connect either one of said drums to said shaft, means for controlling the motion of said shaft, a pair of rocker arms each provided with a pulley near the free end thereof over which passes said rope, and also provided with a roller near the said free end, two rotary disks each provided with a pair of cams with curved cam surface concave to the axis of said disk and oppositely disposed and adapted to engage said roller and so haul on said rope and then to release said roller, and means for rotating one or the other of said disks, as desired, substantially as described.

6. In a well-boring machine, the combination with the overhead pulleys, and ropes leading therefrom down into said well, of a shaft and drums loose thereon for winding up the inner ends of said ropes, clutch couplings connecting said drums with said shaft, a friction feed controlling said shaft, a rocker arm engaging said rope and provided with a roller near the free end thereof, a rotary disk provided with a pair of cams oppositely disposed adapted to engage said roller and so haul on said rope, and then to release said roller, substantially as described.

7. In a well-boring machine, the combination with the overhead pulleys, and ropes leading therefrom down into the well, of a shaft and drums loose thereon for winding up the inner ends of said ropes, a clutch coupling connecting said drums with said shaft, a friction feed and also a friction brake controlling said shaft, a rocker arm provided with a pulley near the free end thereof over which passes said rope, and also provided with a roller near the said free end, a rotary disk provided with a pair of cams oppositely disposed adapted to engage said roller and so haul on said rope and then to release said roller, substantially as described.

8. In an apparatus of the character described, a feed mechanism comprising a shaft, a drum loosely mounted thereon, means for connecting said shaft to said drum when desired, a gear wheel loose on said shaft, a friction pad on one face of said gear wheel, a clamp plate keyed on said shaft and means for pressing the same against the friction pad, and a pinion meshing in said gear wheel, with means for rotating said pinion, and a band brake at the other end of said shaft, substantially as described.

9. In an apparatus of the character described a feed mechanism comprising a shaft, a drum loosely mounted thereon, means for connecting said shaft to said drum when desired, a gear wheel loose on said shaft, a friction pad on one face of said gear wheel, a clamp plate keyed on said shaft, a clamp nut screwed into the end of said shaft and adapted to press against said clamp plate, a pinion meshing in said gear wheel, and a hand wheel on the same shaft with said pinion, and a band brake at the other end of said shaft, substantially as described.

10. In a well-boring machine, the combination with the overhead pulley, and a rope leading therefrom down into said well, of a rocker arm engaging said rope and provided with a roller near the free end thereof, a rotary disk provided with a pair of cams with curved cam surface concave to the axis of said disk, and oppositely disposed and adapted to engage said roller and so haul on said rope, and then to release said roller, and an elastic pad adapted to limit the travel of said rocker arm, substantially as described.

In testimony whereof I affix my signature in presence of two witnesses.

OSCAR P. BENJAMIN.

Witnesses:
C. H. VINTON,
HENRY A. TAYLOR.